April 18, 1939.   C. M. HATHAWAY   2,155,267
FOIL GAUGE
Filed Feb. 19, 1937
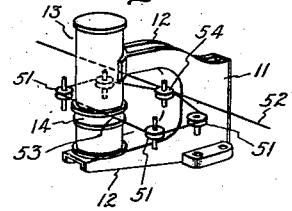
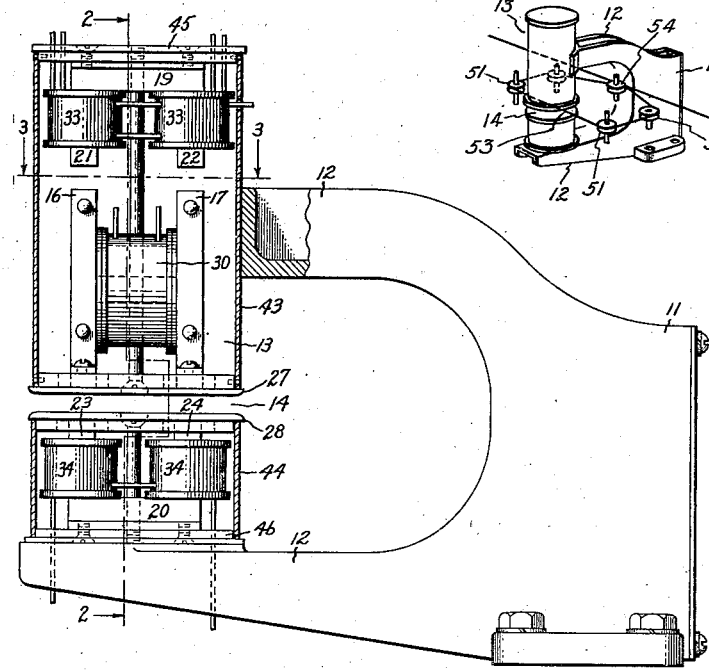
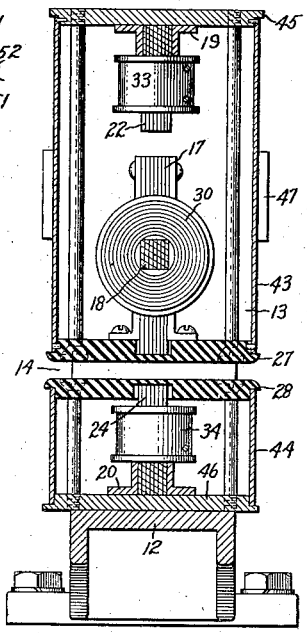
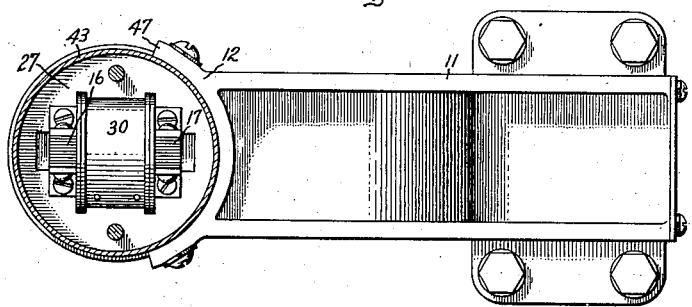
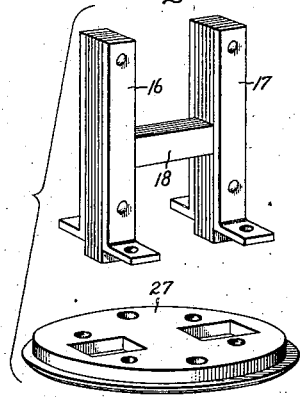
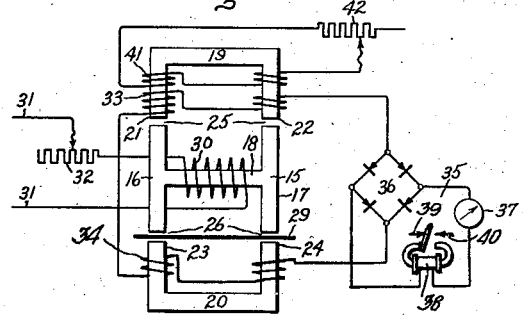
Inventor:
Claude M. Hathaway,
by Harry E. Dunham
His Attorney.

Patented Apr. 18, 1939

2,155,267

UNITED STATES PATENT OFFICE 2,155,267

FOIL GAUGE

Claude M. Hathaway, Niskayuna, N. Y., assignor to General Electric Company, a corporation of New York Application February 19, 1937, Serial No. 126,624

6 Claims. (Cl. 175—183)

My invention relates to electric gauges and concerns particularly thickness gauges for foil and metallic sheets.

It is an object of my invention to provide a simple, sturdy, reliable, compact, and easily operated thickness gauge which is adapted to measure thickness of foil or sheets continuously, if desired, at any speed, and which is unaffected by variations in position of the material being gauged.

It is a further object of my invention to provide apparatus, which is adapted for gauging material varying widely in thickness, in which a relatively large gap may be employed for easily accommodating the material to be gauged, and in which the measurement is relatively unaffected by variations in the size of the gap for receiving the material being gauged.

Still another object of my invention is to provide apparatus for automatically controlling the thickness of foil or sheet material during the process of manufacture.

Additional objects of my invention are the measurement of thickness of metallic wire and the measurement of conductivity or of purity of metallic sheets or wires of uniform thickness.

Other and further objects and advantages will become apparent as the description proceeds.

In carrying out my invention in its preferred form, I provide a pair of jaws carrying co-operating parts of an electric gauge having a gap through which the material to be gauged may be passed. The electric gauge includes a laminated magnetic core with winding in inductive relation to the core. The windings include an exciting winding energized by audio-frequency current and detecting windings which are responsive to the opposition presented to the passage of magnetic flux by material passing through the gap.

The invention may be understood more readily by referring to the following detailed description when considered in connection with the accompanying drawing and the features of my invention which are believed to be novel and patentable will be pointed out in the claims appended hereto. In the drawing, Fig. 1 is a side view, partially in section, of one embodiment of my invention; Fig. 2 is a sectional view cut by the plane 2—2 of Fig. 1; Fig. 3 is the top view of the apparatus of Figs. 1 and 2 showing a section cut by the plane 3—3 of Fig. 1; Fig. 4 is a perspective view of one of the core elements and the face plate of the apparatus of Figs. 1 to 3; Fig. 5 is an electric circuit diagram illustrating schematically the apparatus of Figs. 1 to 4; and Fig. 6 is a perspective view of the apparatus arranged for gauging wire. Like reference characters are utilized throughout the drawing to designate like parts.

Referring more in detail to the drawing, the apparatus consists of a fixture 11 having a pair of jaws 12 carrying an electric gauge head 13 with a gap 14 therein through which material to be gauged is passed. The electric gauge head 13 comprises a laminated field structure, windings carried thereon, a source of exciting current, and current-responsive apparatus for indicating gauge thickness or adjusting the sheet-manufacturing apparatus. The field structure includes an H-shaped core element 15 with a pair of parallel legs 16 and 17 joined by a cross arm 18 and a pair of core elements 19 and 20. These core elements may be of U-shape with parallel legs 21 and 22 and 23 and 24, respectively. The legs 21 and 23 are in line with the legs 16 of the H-shaped core element 15. Likewise, the legs 22 and 24 are in line with the legs 17 of the H-shaped core element 15. The U-shaped elements 19 and 20 are spaced from the H-shaped element 15 to form two pairs of air gaps 25 and 26 between confronting ends of the legs of the elements of the field structure.

The pair of air gaps 26 is adapted to have the foil or other sheet material to be gauged pass through, and face plates 27 and 28 made of non-conducting, nonmagnetic material are provided to cover the confronting ends of the core elements at the gap 26 for protecting the moving foil against injury as well as providing a protective enclosure for the parts of the gauge head. The space between the face plates 27 and 28 forms the gap 14 within which the sheet material 29 is caused to travel. It will be understood that the direction of travel of the sheet 29 is perpendicular to the plane of the paper in the views of Figs. 1 and 5 and parallel to the plane of the paper in the view of Fig. 2, the sheet, itself, being perpendicular to the plane of the paper in either case.

The H-shaped core element 15 carries an exciting winding 30 on its connecting arm 18, and a source of alternating current is connected to the exciting winding 30 preferably through a rheostat or variable impedance 32. The alternating-current source 31 is preferably of audio frequency; i. e., below the radio frequency range; for example, it may be a two thousand cycle per second source. For relatively thick materials such as one-sixteenth inch brass, I have found sixty cycles to be satisfactory. The U-shaped core elements 19 and 20 carry the detecting windings 33 and 34, respectively, and a current-responsive device, such as the rectifier-type alternating-current milliammeter 35, is connected to the windings 33 and 34, the connection being such that the windings 33 and 34 are in series-opposition with respect to voltages induced by the exciting winding 30. The alternating-current milliammeter 35 in the arrangement illustrated consists of a full-wave rectifier 36 of the copper oxide or other suitable type and a direct-current instrument 37.

The invention is not limited, however, to the use of indicating instruments and includes also the use of any current-responsive device, such as telemetering or recording devices or the use of relays for operating a suitable thickness-controlling apparatus not shown. For example, a directional or polarized relay 38 may be connected in series with the instrument 37 and may be provided with oppositely placed contacts 39 and 40, for energizing suitable controls to increase or decrease the thickness of the sheet being produced. The apparatus for forming or rolling the sheets and the controls therefor do not form a part of my invention, and, consequently, are not illustrated in the drawing.

The apparatus may be arranged either as a null device or as a direct indicating device. In either case, it is preferable to provide means for balancing the fluxes produced when a sheet of some thickness, assumed as a standard thickness, is passed through the gap 14. For the purpose of providing compensation under such conditions, a sheet of material of standard thickness may be inserted in the pair of gaps 25 or a compensating winding 41 may be wound upon a suitable part of the field structure, for example, upon the U-shaped core element 19. The winding 41 is a closed circuit winding to simulate the effect of conducting material placed within the gap 25 and preferably the winding 41 is closed through an adjustable resistor or impedance 42 to permit adjustment of the amount of compensation obtained.

I have found that, in some cases, particularly when gauging thin foil, it might be desirable to use a suppressed zero instrument as the instrument 37. For example, I may use a one milliampere instrument and suppress the zero by means of the control springs of the instrument so that one milliampere will be required to start the pointer moving away from zero and two milliamperes to give full scale deflection. Under these conditions, it might be expedient to wind the compensating winding 41 on the U-shaped core element 20 instead of on the element 19.

In order to protect the parts of the electric gauge 13 against dirt, against magnetic dust, and against particles of electrically-conducting material, the parts are preferably enclosed by cylindrical cases 43 and 44 closed at the ends by a plate 45 supporting the U-shaped core element 19, by the face plates 27 and 28, and by a base plate 46 resting upon the lower jaw 12 and supporting the lower U-shaped core element 20. The H-shaped core element 15 is supported by the face plate 27 secured to the cylindrical case 43 and the case 43 is in turn secured to the upper jaw 12 of the fixture 11 by a band 47.

The use of audio-frequency as distinguished from high frequency current for energizing the apparatus results in magnetic flux capable of penetrating the foil 29 and makes the readings relatively independent of the surface characteristics of the foil and responsive only to its thickness. The use of audio-frequency current also makes it unnecessary to provide a vacuum-tube high-frequency generator and together with the use of iron core elements makes it possible to obtain sufficient response for the operation of ordinary instruments and relays without the interposition of amplifiers. Furthermore, the design results in a particularly rugged construction.

It will be understood that, in the operation of the apparatus, the sheet 29 of material being gauged, which may be in the form of a ribbon, in most cases of nonmagnetic metal, is passed from the rolls by which it is reduced to final size or from a reel on which it may be stored through the gap 14 on to a reel upon which it is rerolled. Since the sheet 29 is composed of electrically-conducting material, it opposes the passage of flux across the pair of air gaps 26 and the strength of the opposition to flux depends upon the thickness of the material 29. The windings 30 and 34 form the primary and secondary windings, respectively, of a transformer of which the transformer ratio is varied by the opposition to flux passage produced by the sheet 29. The detecting winding 33 also forms a second secondary winding of the transformer and, since the windings 33 and 34 are connected in series-opposition, a variation in the opposition to flux produced by the sheet 29 varies the relative magnitudes of the voltages induced in the windings 33 and 34. The rheostat 42 may accordingly be adjusted to vary the effect of the winding 41 and produce a null deflection of the instrument 37 when a sheet of the proper thickness is placed within the gap 14.

In case of deviations from the desired thickness, the opposition to flux crossing the pair of air gaps 26 will vary, varying the voltage induced in the windings 34 and unbalancing the voltages appearing in the secondary windings, thereby producing a reading in the instrument 37 and operating the relay 38 in whichever direction is required to correct the adjustment of the sheet-producing apparatus. If desired, of course, the rheostat 42 may be so set as to produce a zero deflection of the instrument 37 when no sheet is present in the gaps 26 and the instrument 37 may then be calibrated in terms of the thickness of sheet passed through the gaps 26. In this case, a contact-making voltmeter will be substituted for the directional relay 38 and it will be adjusted to operate at the voltage corresponding to the desired sheet thickness.

Although I have explained the operation of my apparatus in connection with thickness gauging of sheets, it will be understood that my invention is not limited thereto and that the apparatus may also be used for gauging wire passed through the gap in closed loops, or for measuring or gauging conductivity or purity of sheets or wires of conducting material known to be of uniform thickness.

Wire may also be gauged or tested continuously. For example, as illustrated in Figure 6, nonmagnetic guide rollers or sheaves 51 may be provided for holding a wire 52 in the form of a loop with a portion 53 passing through the air gap 14 between the legs 16 and 17 of the magnetic core element 15. An additional roller or sheave 54 is provided which is composed of material which is nonmagnetic but which serves as a good conductor of electricity, such as copper. Consequently, an electrically-closed loop of wire is formed, notwithstanding the fact that the wire may travel around the rollers continuously as the wire is passed through the testing apparatus. It will be understood that suitable arrangements are to be provided for keeping the wire 52 taut and maintaining a good contact at the roller 54. Obviously, the loop of wire 52 reacts upon the magnetic field of the apparatus and thus permits readings to be obtained of the thickness or purity of the wire, as previously explained, as well as permitting indications of flaws, such as cracks or transverse cuts.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A foil thickness gauge comprising in combination, an H-shaped laminated core element with parallel legs joined by a cross arm, an exciting winding on said cross arm, a source of audio-frequency alternating current connected to said winding, a pair of U-shaped laminated core elements with laminated legs joined by core portions, one of said U-shaped elements being adjacent one end of said H-shaped elements to form air gaps between the ends of the parallel legs of said adjacent element and the other of said U-shaped elements being adjacent the other end of said H-shaped element to form air gaps between the ends of the parallel legs of said latter U-shaped element and said H-shaped element, one of said air gaps being adapted for passage of foil to be gauged, a current-responsive device, detecting windings on each of said U-shaped elements connected to said current-responsive device in series-opposition, a compensating winding on one of said U-shaped elements, and an adjustable resistor connected between the ends of said compensating winding.

2. A foil thickness gauge comprising in combination, an H-shaped laminated core element with parallel legs joined by a cross arm, an exciting winding on said cross arm, a source of audio-frequency alternating current connected to said winding, a pair of laminated core elements with end portions respectively adjacent the ends of said H-shaped element to form air gaps between the ends of the parallel legs of said H-shaped element and said other core elements, one of said air gaps being adapted for passing foil to be gauged, a current-responsive device, detecting windings linking said core elements on either side of said cross arm and connected to said current-responsive device in series-opposition, and compensating means in inductive relation to the portion of the core elements on the side of said cross arm opposite the air gap for passing foil to be gauged.

3. A foil thickness gauge comprising in combination, a magnetic core element with branches forming parallel magnetic circuits, an exciting winding in inductive relation to both of said magnetic core branches, a source of audio-frequency alternating current connected to said winding, each of said magnetic core branches including a pair of air gaps, one of said pair of air gaps being adapted for passage of foil to be gauged, a current responsive device, a detecting winding linking one of said core branches, and a second detecting winding linking the other of said core branches, at least one of said detecting windings being placed on the portion of a branch of the core separated from the exciting winding by air gaps, said detecting windings being connected to said current responsive device in series opposition, and a closed current-conducting compensating circuit in inductive relation to one of said core branches at the portion thereof separated from said exciting winding by a pair of said air gaps.

4. A foil thickness gauge comprising in combination, a magnetic core element with branches forming parallel magnetic circuits, an exciting winding in inductive relation to both of said magnetic core branches, a source of audio-frequency alternating current connected to said winding, each of said magnetic core branches including a pair of air gaps, one of said air gaps being adapted for passage of foil to be gauged, a current responsive device, a detecting winding linking one of said core branches, a second detecting winding linking the other of said core branches, and a current-conducting compensating circuit linking one of said core branches, each of said detecting windings being placed on the portion of a branch of the core separated from the exciting winding by a pair of air gaps, said detecting windings being connected to said current responsive device in series opposition and said compensating circuit having a portion thereof on the same portion of a core branch as one of said detecting windings.

5. A continuous gauge for electrically conducting material comprising in combination, a magnetic core element with branches forming parallel magnetic circuits, an exciting winding in inductive relation to both of said magnetic core branches, a source of audio-frequency alternating current connected to said winding, means for passing electrically conducting material forming a closed eddy current path in inductive relation to one of said core branches, a current responsive device, a detecting winding linking one of said core branches, and a second detecting winding linking the other of said core branches, said detecting windings being connected to said current responsive device in series opposition, and compensating means in inductive relation to one of said core branches.

6. A continuous gauge for electrically conducting material comprising in combination, a magnetic core element with branches forming parallel magnetic circuits, an exciting winding in inductive relation to both of said magnetic core branches, a source of audio-frequency alternating current connected to said winding, one of said magnetic core branches including a pair of air gaps, one of said magnetic core branches being adapted to receive electrically conducting material to be gauged in inductive relation to said core branch, a current responsive device, a detecting winding linking one of said core branches, a second detecting winding linking the other of said core branches, at least one of said detecting windings being placed on the portion of its branch of the core separated from the exciting winding by said air gaps, said detecting windings being connected to said current responsive device in series opposition, and compensating means in inductive relation to one of said core branches.

CLAUDE M. HATHAWAY.